United States Patent
Samavati et al.

(10) Patent No.: US 7,650,173 B2
(45) Date of Patent: Jan. 19, 2010

(54) COMBINED ANTENNA MODULE WITH SINGLE OUTPUT

(75) Inventors: Hamid Samavati, Kalmar (SE); Lars Olof Petersson, Aby (SE)

(73) Assignee: Flextronics AP, LLC, Broomfield, CO (US)

( * ) Notice: Subject to any disclaimer, the term of this patent is extended or adjusted under 35 U.S.C. 154(b) by 461 days.

(21) Appl. No.: 11/538,952

(22) Filed: Oct. 5, 2006

(65) Prior Publication Data
US 2007/0182626 A1 Aug. 9, 2007

Related U.S. Application Data

(60) Provisional application No. 60/724,121, filed on Oct. 6, 2005.

(51) Int. Cl.
*H04M 1/00* (2006.01)
*H04B 7/00* (2006.01)

(52) U.S. Cl. .............. 455/575.9; 455/562.1; 455/575.7; 455/277.1

(58) Field of Classification Search .............. 455/562.1, 455/575.7, 575.9, 99, 121, 129, 193.1, 279.1; 343/711, 712, 713, 742
See application file for complete search history.

(56) References Cited

U.S. PATENT DOCUMENTS

| | | | |
|---|---|---|---|
| 4,788,549 A * | 11/1988 | Ohe et al. ..................... | 343/712 |
| 5,627,551 A | 5/1997 | Tsuru et al. | |
| 5,696,517 A | 12/1997 | Kawahata et al. | |
| 5,943,018 A | 8/1999 | Miller | |
| 5,959,581 A * | 9/1999 | Fusinski .............. | 343/700 MS |
| 5,969,690 A | 10/1999 | Yamabayashi et al. | |
| 6,127,979 A | 10/2000 | Zhou et al. | |
| 6,137,452 A | 10/2000 | Sullivan | |
| 6,147,660 A | 11/2000 | Elliott | |
| 6,150,984 A | 11/2000 | Suguro et al. | |
| 6,215,450 B1 * | 4/2001 | Oka ............................ | 343/713 |
| 6,236,372 B1 * | 5/2001 | Lindenmeier et al. ........ | 343/713 |
| 6,329,954 B1 | 12/2001 | Fuchs et al. | |
| 6,693,601 B2 | 2/2004 | Billiet et al. | |
| 6,697,019 B1 | 2/2004 | Hyuk-Joon et al. | |
| 6,870,509 B2 * | 3/2005 | Ooe et al. ..................... | 343/711 |
| 6,897,815 B2 | 5/2005 | Goto et al. | |
| 6,927,736 B1 * | 8/2005 | Kornbau et al. ............. | 343/712 |
| 6,943,741 B2 * | 9/2005 | Bally et al. .................. | 343/713 |
| 2003/0058187 A1 | 3/2003 | Billiet et al. | |

(Continued)

FOREIGN PATENT DOCUMENTS

JP 06152237 A 5/1994

(Continued)

*Primary Examiner*—Sonny Trinh
(74) *Attorney, Agent, or Firm*—Robert G. Crouch; Bobby B. Soltani; Marsh Fischmann & Breyfogle, LLP

(57) ABSTRACT

An antenna module on a vehicle having an antenna for receiving satellite radio signals and an antenna for receiving GPS signals. The two antennas may or may not be on a common ceramic substrate. Either of the two antennas may be a ceramic patch antenna or a helical antenna. The respective signals from each of the antenna as is amplified by a low noise amplifier, filtered, and then combined onto a single conductor and amplified prior to being provided on a single conductor routed through the vehicle to a remotely-located pair of receivers.

27 Claims, 4 Drawing Sheets

U.S. PATENT DOCUMENTS

| | | |
|---|---|---|
| 2004/0056812 A1 | 3/2004 | Sabet et al. |
| 2004/0217907 A1 | 11/2004 | Inoue |

FOREIGN PATENT DOCUMENTS

| | | |
|---|---|---|
| JP | 11074721 A | 3/1999 |
| JP | 2000312111 A | 7/2000 |
| WO | 8502719 | 6/1985 |
| WO | 9413029 | 6/1994 |
| WO | WO 2005060717 A2 | 7/2005 |

* cited by examiner

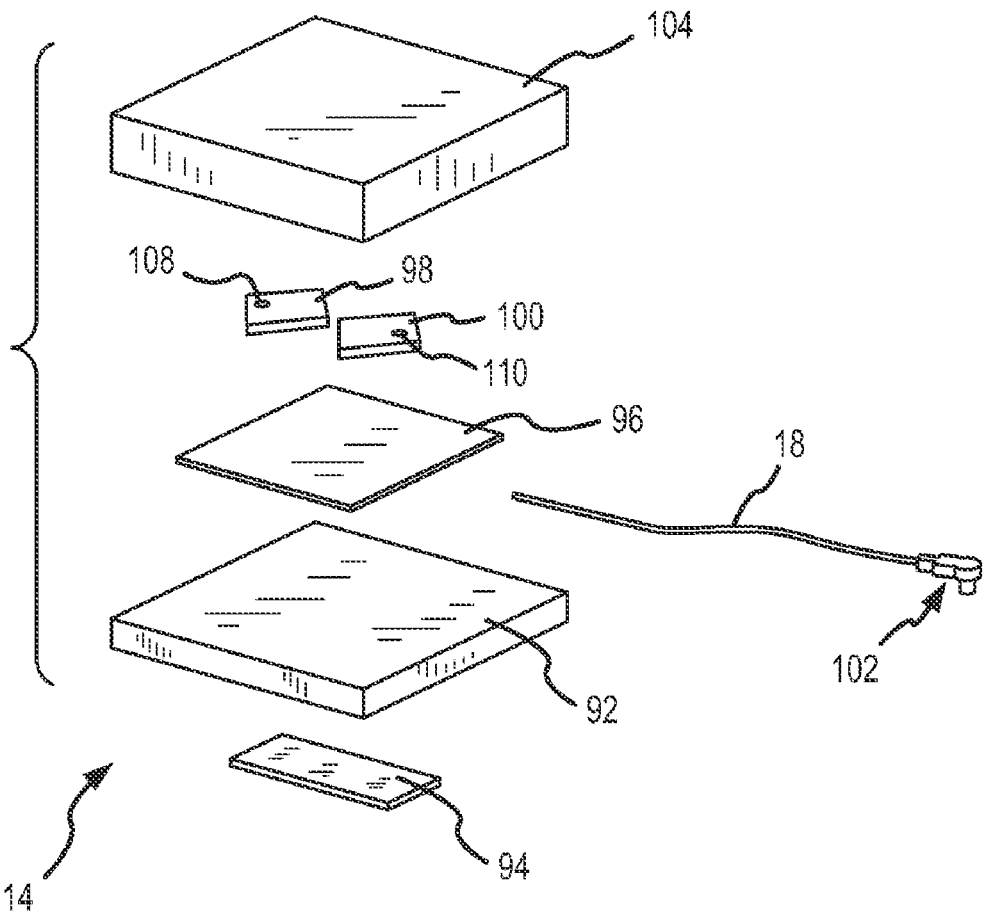
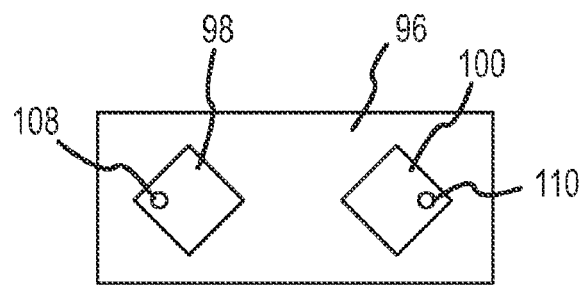

COMBINED ANTENNA MODULE WITH SINGLE OUTPUT

This application claims priority from U.S. Provisional Patent Application No. 60/724,121, filed Oct. 6, 2005, and entitled "Combined Antenna Module with Single Output," the contents of which are incorporated herein by reference.

BACKGROUND

Modern vehicles have sophisticated electronics systems that may utilize information from external sources. Consequently, these electronic systems may send and/or receive RF signals to and from other vehicles, satellites, base stations, and so forth. Further, the electronic systems may send or receive multiple RF signals via multiple antennas.

As a result of these requirements, modern vehicles may include multiple antenna elements, multiple antenna enclosures, multiple electronics for the multiple antennas, and multiple transmission lines/conductors to carry the RF signals between the electronic systems and the antennas.

The foregoing examples of the related art and limitations related therewith are intended to be illustrative and not exclusive. Other limitations of the related art will become apparent to those of skill in the art upon a reading of the specification and a study of the drawings.

SUMMARY

The following embodiments and aspects of thereof are described and illustrated in conjunction with systems, tools, and methods which are meant to be exemplary and illustrative, and not limiting in scope. In various embodiments, one or more of the above-described problems have been reduced or eliminated, while other embodiments are directed to other improvements.

An antenna module for use in an automotive vehicle includes a first antenna element that receives electromagnetic signals at a first particular frequency range and produces a first received signal; a second antenna element that receives electromagnetic signals at a second particular frequency range and produces a second received signal; a combiner that combines the first and second received signals to produce a combined signal; and a conductor connected to the combiner to carry the combined signal out of the antenna module.

Each of the first and second antenna elements may be ceramic patch antennas. The ceramic patch antennas may be formed on the same ceramic. One of the first and second antenna elements may be a ceramic patch antenna and the other may be a helical antenna. Each of the first and second antenna elements may be helical antennas. The first antenna element may be designed to receive GPS signals. The second antenna element may be designed to receive satellite radio signals. The first antenna element may be designed to receive electromagnetic signals having a frequency in the range of 1575 MHz. The first antenna element may be designed to receive electromagnetic signals having a frequency in the range of 1574 MHZ to 1577 MHz. The second antenna element may be designed to receive electromagnetic signals having a frequency in the range of 2340 MHz. The second antenna element may be designed to receive electromagnetic signals having a frequency in the range of 2320 MHZ to 2345 MHz.

The antenna module may include a first amplifier to amplify the first received signal prior to being combined with the second received signal and a second amplifier to amplify the second received signal prior to being combined with the first received signal. The first and second amplifiers may be low-noise amplifiers. The antenna module may include a common ground plane to which the first and second amplifiers are connected. The antenna module may include a first filter to filter the first received signal prior to being combined with the second received signal and a second filter to filter the second received signal prior to being combined with the first received signal.

The antenna module may include a housing that contains at least the first and second antenna element and the combiner. The antenna module may include a magnet attached to the housing for selective removable attachment to a metal object.

The conductor may be part of a coaxial cable. The combined signal may include a first signal component at the first particular frequency range and a second signal component at the second particular frequency range.

Each of the first and second antenna elements may have a feeding point, and the antenna elements may be oriented relative to each other to maximize the distance between the feeding points of the two antenna elements. Each of the first and second antenna elements may generally lie in a common plane and each have a feeding point, and the antenna elements may be rotated relative to each other to maximize the distance between the feeding points of the two antenna elements.

An antenna module for use in an automotive vehicle includes a GPS antenna element that receives electromagnetic signals at a GPS frequency range and produces a GPS received signal; a first amplifier to amplify the GPS received signal; a satellite radio antenna element that receives electromagnetic signals at a satellite radio frequency range and produces a satellite radio received signal; a second amplifier to amplify the satellite radio received signal; a combiner that combines the amplified GPS and satellite radio received signals to produce a combined signal; and a conductor connected to the combiner to carry the combined signal out of the antenna module.

An RF receiver system for use in an automotive vehicle includes an antenna module that includes a first antenna element that receives electromagnetic RF signals at a first particular frequency range and produces a first received signal; a second antenna element that receives electromagnetic RF signals at a second particular frequency range and produces a second received signal; and a combiner that combines the first and second received signals to produce a combined signal. The RF receiver system also includes a conductor connected to the combiner to carry the combined signal out of the antenna module. The RF receiver system further includes a first receiver subsystem that is receptive of the combined signal from the conductor, the first receiver subsystem including a filter to allow at least the components of the combined signal that are at the first particular frequency range to pass therethrough and a receiver to receive the components of the combined signal that are at the first particular frequency range. The RF receiver system still further includes a second receiver subsystem that is receptive of the combined signal from the conductor, the second receiver subsystem including a filter to allow at least the components of the combined signal that are at the second particular frequency range to pass therethrough and a receiver to receive the components of the combined signal that are at the second particular frequency range. The first and second receiver subsystems are located remotely from the antenna module.

The antenna module may be located on the exterior of the automobile and the receiver subsystems located in the instrument panel.

A method of receiving different RF signals in an automotive vehicle includes receiving a first RF signal of a first frequency with a first antenna; receiving a second RF signal of a second frequency with a second antenna, the second antenna being located in a common module with the first antenna; combining the first and second RF signals into a combined signal; conducting the combined signal along a single conductor; supplying the combined signal to a remotely-located first receiver to receive a signal at the first frequency; and supplying the combined signal to a remotely-located second receiver to receive a signal at the second frequency.

In addition to the exemplary aspects and embodiments described above, further aspects and embodiments will become apparent by reference to the drawings and by study of the following descriptions.

BRIEF DESCRIPTION OF THE DRAWINGS

Exemplary embodiments are illustrated in referenced figures of the drawings. It is intended that the embodiments and figures disclosed herein be considered illustrative rather than limiting.

FIG. 7 is an exploded perspective view of the first embodiment shown in FIG. 3.

FIG. 8 is a top view of the circuit board of the combined antenna module of FIG. 7, showing the relative orientation of the two antennas.

DETAILED DESCRIPTION

Reference will now be made to the accompanying drawings, which assist in illustrating the various pertinent features of the present invention. Although the present invention will now be described primarily in conjunction with a combined antenna module for an automotive application, it should be expressly understood that the present invention may be applicable to other applications where it is desired to combine the output of two different signals received by antennas. In this regard, the following description of a combined antenna module with single output is presented for purposes of illustration and description. Furthermore, the description is not intended to limit the invention to the form disclosed herein. Consequently, variations and modifications commensurate with the following teachings, and skill and knowledge of the relevant art, are within the scope of the present invention. The embodiments described herein are further intended to explain modes known of practicing the invention and to enable others skilled in the art to utilize the invention in such, or other embodiments and with various modifications required by the particular application(s) or use(s) of the present invention.

Figure 1:
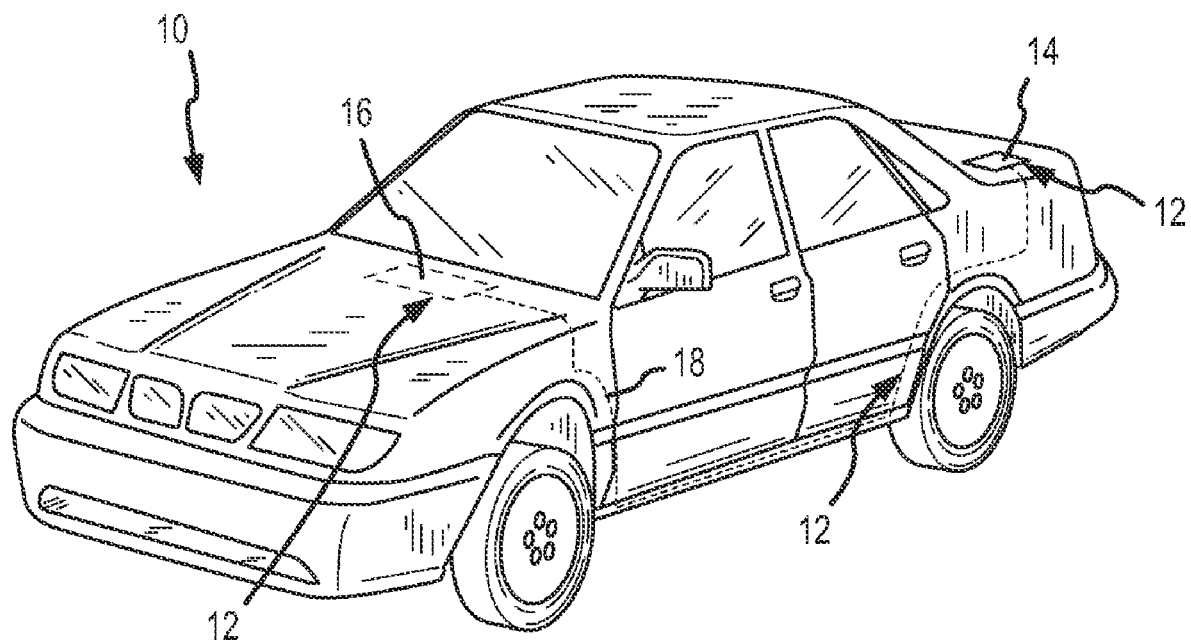
FIG. 1 is a perspective view of an automobile containing the combined antenna module and receiver system of the present invention.

An automobile 10 including a combined antenna module and receiver system 12 is shown in FIG. 1. Of course, the techniques disclosed herein are equally applicable to other types of vehicles. The system 12 includes a combined antenna module 14 and a receiver subsystem 16. The antenna module 14 is operatively connected to the receiver subsystem by a cable 18 that runs through, or around, the interior compartment of the automobile 10. While the various components of the system 12 could be located at any of various locations in the automobile, one exemplary location for the antenna module 14 may be on the exterior of the car, such as on the trunk lid or roof. Similarly, the receiver subsystem 16 may be located at any of various locations in the automobile, but exemplary locations for the receiver subsystem 16 may be in the instrument panel or in the rear of the engine compartment of the automobile 10, just forward of the dashboard and in the vicinity of other electronics systems in the automobile 10.

Figure 2:
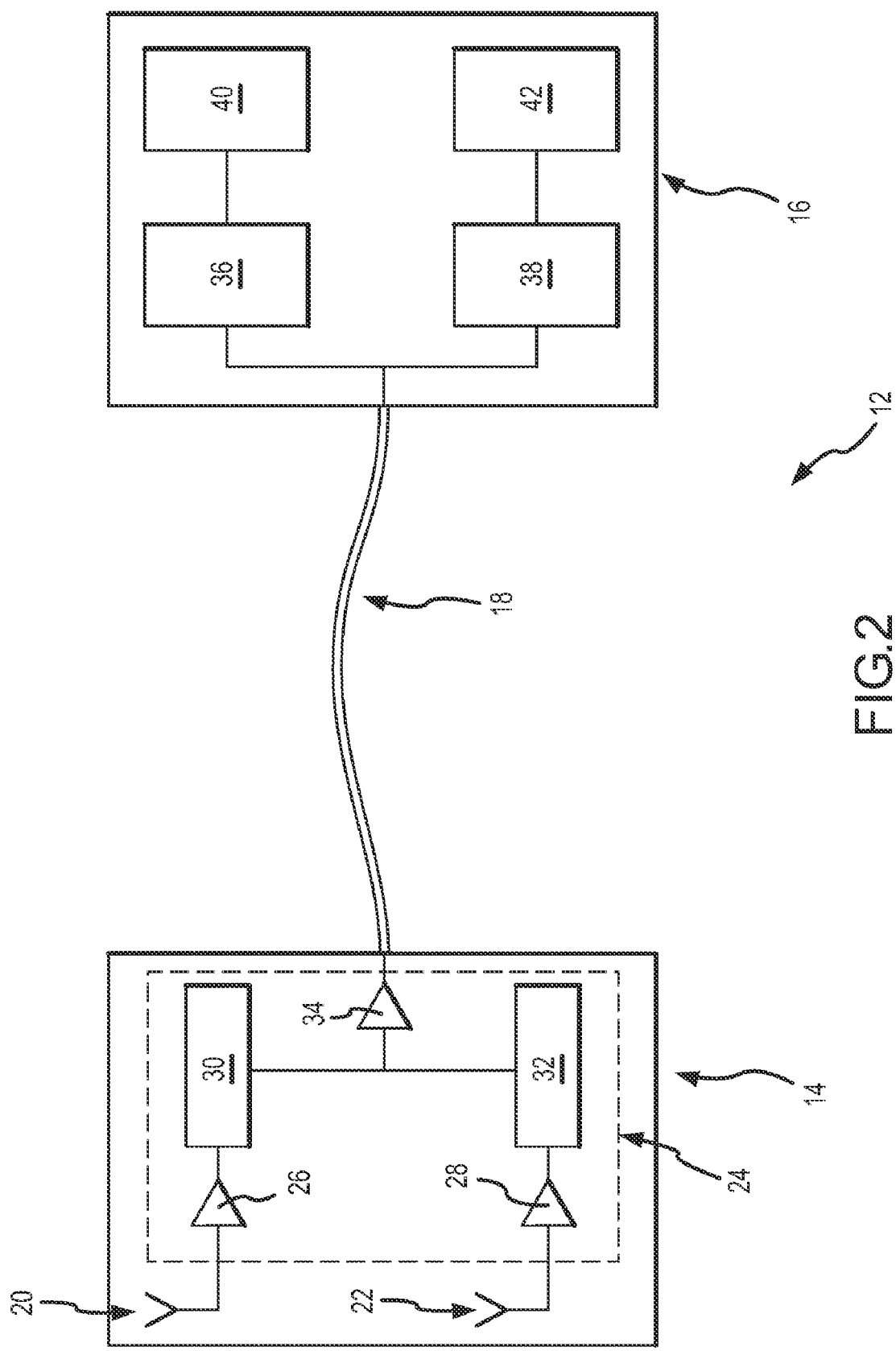
FIG. 2 is a block diagram showing certain major components of the combined antenna module and receiver system of FIG. 1.

The components of the system 12 are illustrated in more detail in the block diagram of FIG. 2. As can be seen, the antenna module 14 includes a first antenna 20 and a second antenna 22. The antennas 20 and 22 provide signals that are fed to low noise front-end circuitry 24. The front-end circuitry 24 includes a first low noise amplifier 26 receptive of the signals from the first antenna 20 and a second low noise amplifier 28 receptive of the signals from the second antenna 22. The respective signals from the low noise amplifiers 26 and 28 are then applied to respective bandpass filters 30 and 32. The respective signals from the bandpass filters 30 and 32 are then combined and fed to an amplifier 34 for amplification prior to being provided to the cable 18. The combined signal that is amplified by the amplifier 34 will be a combination of the respective signals from the bandpass filters 30 and 32, and will thus have components of the signal from the bandpass filter 30 and components of the signal from the bandpass filter 32. For example, if the two antennas each received a signal at a different frequency from the other, then the combined signal would contain components at those two different frequencies.

The cable 18 may be of sufficient length to route the combined signal from the antenna module 14 to the receiver subsystem 16. For example, it may be a 16 to 22 foot coaxial cable (e.g., RG174 or similar), although other lengths and types of cable could also be employed. Also other suitable types of conductors could be employed including strip-line transmission along a circuit board.

The receiver subsystem 16 includes a first bandpass filter 36 and a second bandpass filter 38. This signal, sent from the antenna module 14 along the cable 18, is applied to each of the bandpass filters 36 and 38. The two filters 36 and 38 each have a different passband in order to pass different frequencies therethrough. The signal that passes through the bandpass filter 36 is provided to a first receiver 40, while the signal that passes through the second bandpass filter 38 is provided to a second receiver 42.

In this manner, the two antennas 20 and 22 can receive different signals (potentially from different sources) and can provide them in a combined fashion from the antenna module 14 along a single cable 18 to the receiver subsystem 16, where the signal is filtered so as to provide the signal from the first antenna 20 to the first receiver 40 and provide the signal from the second antenna 22 to the second receiver 42. As can be seen, this is accomplished with a single combined antenna module 14 and a single cable 18.

This technique can be applied to many different types of received signals. One example of such a pair of received signals are signals received from a satellite radio satellite system and signals received from a GPS satellite system, respectively. One example of a satellite radio system is the XM® satellite radio system, which provides RF signals from its satellites at a frequency of 2332.5 MHz to 2345.0 MHz. Further, an example of the RF signals provided from GPS satellites is provided in the frequency range from 1574.42

MHz to 1576.42 MHz. A third type of received signals may be from the Sirius Satellite Radio® system, which provides RF signals from its satellites at a frequency of 2320.0 MHz to 2332.5 MHz. Other types of signals may include satellite television signals as well as any other type of electromagnetic signals.

Figure 3:
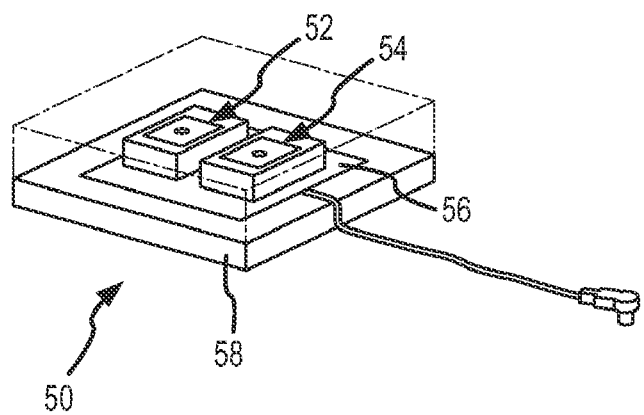
FIG. 3 is a perspective view of a first embodiment of a combined antenna module of the present invention.

The combined antenna module 14 described above may employ different types of antennas as shown in FIGS. 3-6. In FIG. 3, a combined antenna module 50 is shown having a pair of ceramic patch antennas 52 and 54 located on a circuit board 56 mounted to a base plate 58. An upper housing is shown in phantom lines.

Figure 4:
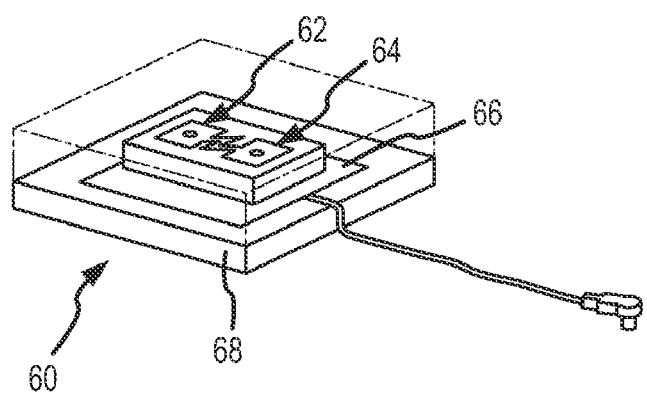
FIG. 4 is a perspective view of a second embodiment of a combined antenna module of the present invention.

In FIG. 4, a combined antenna module 60 is shown having a pair of ceramic patch antennas 62 and 64 located on a common piece of ceramic mounted on a circuit board 66 mounted to a base plate 68. An upper housing is shown in phantom lines.

Figure 5:
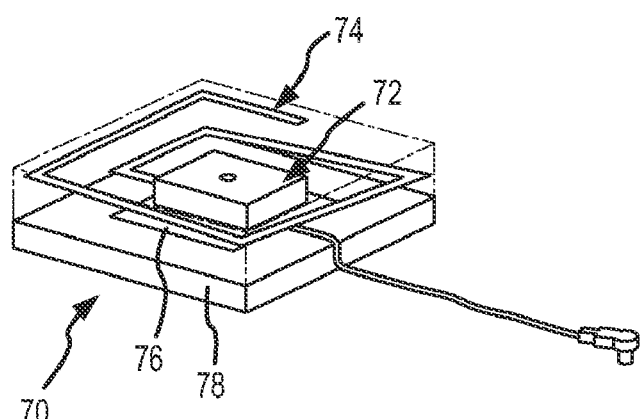
FIG. 5 is a perspective view of a third embodiment of a combined antenna module of the present invention.

In FIG. 5, a combined antenna module 70 is shown having a pair of antennas 72 and 74. One of the antennas 72 is a ceramic patch antenna located on a circuit board 76 mounted to a base plate 78. The second antenna 74 is a helical antenna attached to the circuit board. An upper housing is shown in phantom lines.

Figure 6:
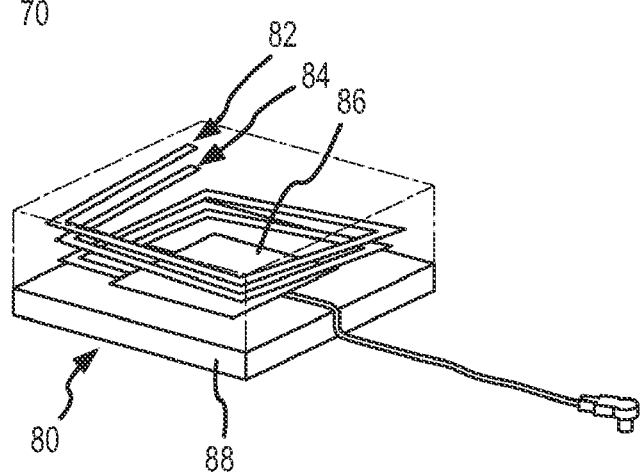
FIG. 6 is a perspective view of a fourth embodiment of a combined antenna module of the present invention.

In FIG. 6, a combined antenna module 80 is shown having a pair of helical antennas 82 and 84 attached to a circuit board 86 mounted to a base plate 88. An upper housing is shown in phantom lines.

Other types of antennas or combinations thereof could be employed including GSM antennas, yagi antennas, dipole antennas, as well as any other suitable type of antenna. Further, for whatever type of antenna is used, the antenna may be optimized for the type of signal to be received thereby. It may also be possible to use a single antenna element to receive two different signals. In addition, the antennas may be located further apart from each than is described herein and the signals therefrom may be brought together and combined as described herein. Nevertheless, integrating the two antennas together (such as within the same module or on a single substrate) may provide for reduced manufacturing cost, reduced part count, and smaller form factor. Still further, the signals from more than two antennas (e.g., three, four, or more) may be combined in a similar fashion.

Further mechanical details about the combined antenna module 14 are provided in the exploded view of FIG. 7. As can be seen, the antenna module 14 includes a base plate 92 to which a magnet 94 is attachable for attachment of the antenna module 14 to a suitable portion of the automobile, such as the trunk lid. Also mounted to the base plate 92 is a circuit board 96, on the bottom side thereof of which the low noise front-end circuitry 24 is provided. A shielding box (not shown) may cover the low noise front-end circuitry 24 to protect the circuitry from RF interference. On an upper side of the circuit board 96, two ceramic patch antennas 98 and 100 are attached. In this manner, the antennas 98 and 100 are attached to the same ground plane. Further, the cable 18 is also attached to the circuit board 96. The cable 18 may have a suitable connector 102 (e.g., SMB plug) at an opposite end thereof for attachment to the receiver subsystem 16. A plastic housing 104 may be attachable to the base plate 92 and may utilize a gasket or seal (not shown) in order to enclose and hermetically seal the circuit board 96 and antennas 98 and 100 between the plastic housing 104 and the base plate 92. Although not shown, a protective film may be attached to the outer bottom surface of the module 14 to protect the paint on the automobile.

As shown in FIGS. 7 and 8, the antennas 98 and 100 may be located in substantially the same plane by being mounted to the circuit board 96. Further, each antenna 98 and 100 may have feeding points 108 and 110, respectively, where a conductor or transmission line attaches to the antenna so that the RF signals received by each antenna can be fed to downstream circuitry. In some conditions, performance of the antenna module may be enhanced by having the antennas 98 and 100 rotated/oriented relative to each other so as to maximize the distance between the feeding points 108 and 110, as shown best in FIG. 8.

Although only provided as exemplary of the circuitry in the low noise front-end circuitry, the first low noise amplifier 26 and the first bandpass filter 30 may be designed as the XM path, and the first low noise amplifier 26 may include a discrete P-HEMT (Pseudomorphic High Electron Mobility Transistor) such as an Agilent ATF-551M4 and may have a gain of 13.5 dB, a noise figure of 0.65 dB, a $V_{dS}$ of 2.1V, and an $I_d$ of 22 mA. The first bandpass filter 30 may be a Murata DFCB32G33LBJAA and may have a center frequency of 2339 MHz, a bandwidth of 14 MHz, a Loss I passband typical of 2.1 dB and max of 3 dB, and an attenuation $f_c$ of ±260 MHz, min 35 dB. Further, although not shown, there may be another low noise amplifier downstream of the first bandpass filter 30 which may be a GaAs MMIC RFMD RF2373 with a gain of 16.5 dB, a noise figure of 1.4 dB, an OP1 dB of 10 dB, an OIP3 of 24 dB, and a current of 18 mA. Additionally, there may be an attenuation stage downstream of the additional low noise amplifier. For example, it may have an attenuation in the range of 7 or 8 dB The second low noise amplifier 28 and the second bandpass filter 32 may be designed as the GPS path, and the second low noise amplifier 28 may include a SIGe MMIC Infineon BGA615L7 and may have a gain of 18 dB, a noise figure of 1.0 dB, an IP1 dB of −11 dB, and an IIP3 of −1 dB. The second bandpass filter 32 may be a SAW filter Murata SAFSE1G57KC0T00 and may have a center frequency of 1575.5 MHz, a bandwidth of 3 MHz, and a loss in passband max of 2.5 dB.

The XM and GPS signals may be combined by a T-junction as a combiner, although other suitable combiners could be used. Once combined, the signal is amplified by the amplifier 34, such as a discrete bipolar transistor Infineon LNA BFP650, with a gain to the XM signal of 12 dB with a noise figure of 2.3 dB and a gain to the GPS signal of 14 dB with a noise figure of 2.3 dB. The cable 18 may provide in the range of 11-16 dB of loss. Also, the amplifier 34 may be part of a MMIC or RFIC.

The foregoing description has been presented for purposes of illustration and description. Furthermore, the description is not intended to limit the invention to the form disclosed herein. While a number of exemplary aspects and embodiments have been discussed above, those of skill in the art will recognize certain variations, modifications, permutations, additions, and sub-combinations thereof. It is therefore intended that the following appended claims and claims hereafter introduced are interpreted to include all such variations, modifications, permutations, additions, and sub-combinations as are within their true spirit and scope.

What is claimed is:

1. An RF receiver system for use in an automotive vehicle, comprising:
    an antenna module that includes:
        a first antenna element that receives electromagnetic RF signals at a first particular frequency range and produces a first received signal;
        a second antenna element that receives electromagnetic RF signals at a second particular frequency range and produces a second received signal; and a combiner that combines the first and second received signals to produce a combined signal;

a conductor connected to the combiner to carry the combined signal out of the antenna module;

a first receiver subsystem that is receptive of the combined signal from the conductor, the first receiver subsystem including a filter to allow at least the components of the combined signal that are at the first particular frequency range to pass therethrough and a receiver to receive the components of the combined signal that are at the first particular frequency range; and a second receiver subsystem that is receptive of the combined signal from the conductor, the second receiver subsystem including a filter to allow at least the components of the combined signal that are at the second particular frequency range to pass therethrough and a receiver to receive the components of the combined signal that are at the second particular frequency range;

wherein the first and second receiver subsystems are located remotely from the antenna module.

2. An RF receiver system as defined in claim 1, wherein the antenna module is located on the exterior of the automotive vehicle and the receiver subsystems are located in an instrument panel of the automotive vehicle.

3. An RF receiver system as defined in claim 1, wherein each of the first and second antenna elements are ceramic patch antennas.

4. An RF receiver system as defined in claim 1, wherein one of the first and second antenna elements is a ceramic patch antenna and the other is a helical antenna.

5. An RF receiver system as defined in claim 1, wherein the first antenna element is designed to receive GPS signals and the second antenna element is designed to receive satellite radio signals.

6. An RF receiver system as defined in claim 1, wherein the first antenna element is designed to receive electromagnetic signals having a frequency in the range of 1575 MHz and the second antenna element is designed to receive electromagnetic signals having a frequency in the range of 2340 MHz.

7. An RF receiver system as defined in claim 1, wherein the antenna module further includes:

a first amplifier to amplify the first received signal prior to being combined with the second received signal; and a second amplifier to amplify the second received signal prior to being combined with the first received signal.

8. An RF receiver system as defined in claim 7, wherein the first and second amplifiers are low-noise amplifiers.

9. An RF receiver system as defined in claim 1, wherein the antenna module further includes:

a first filter to filter the first received signal prior to being combined with the second received signal; and a second filter to filter the second received signal prior to being combined with the first received signal.

10. An RF receiver system as defined in claim 1, wherein the antenna module further includes:

a housing that contains at least the first and second antenna elements and the combiner.

11. An RF receiver system as defined in claim 10, further including:

a magnet attached to the housing for selective removable attachment to a metal object.

12. An RF receiver system as defined in claim 1, wherein each of the first and second antenna elements has a feeding point, and the two antenna elements are oriented relative to each other to maximize the distance between the feeding points of the two antenna elements.

13. An RF receiver system as defined in claim 1, wherein each of the first and second antenna elements generally lie in a common plane and each has a feeding point, and wherein the antenna elements are rotated relative to each other to maximize the distance between the feeding points of the two antenna elements.

14. A method of receiving different RF signals in an automotive vehicle, comprising:

receiving a first RF signal of a first frequency with a first antenna;

receiving a second RF signal of a second frequency with a second antenna, the second antenna being located in a common module with the first antenna;

combining the first and second RF signals into a combined signal;

conducting the combined signal along a single conductor;

supplying the combined signal to a remotely-located first receiver to receive a signal at the first frequency; and supplying the combined signal to a remotely-located second receiver to receive a signal at the second frequency.

15. A method as defined in claim 14, wherein the common module is located on the exterior of the automotive vehicle and the first receiver and second receiver are located in an instrument panel of the automotive vehicle.

16. A method as defined in claim 14, wherein each of the first and second antennas are ceramic patch antennas.

17. A method as defined in claim 14, wherein one of the first and second antennas is a ceramic patch antenna and the other is a helical antenna.

18. A method as defined in claim 14, wherein the receiving a first RF signal step includes receiving a GPS signal and wherein the receiving the second RF signal includes receiving a satellite radio signal.

19. A method as defined in claim 14, wherein the receiving a first RF signal step includes receiving an electromagnetic signal having a frequency in the range of 1575 MHz, and wherein the receiving a second RF signal step includes receiving an electromagnetic signal having a frequency in the range of 2340 MHz.

20. A method as defined in claim 14, further including:

amplifying the first received RF signal prior to the combining step; and amplifying the second received RF signal prior to the combining step.

21. A method as defined in claim 20, wherein the amplifying the first received RF signal step and the amplifying the second received RF signal step include utilizing low-noise amplifiers.

22. A method as defined in claim 14, further including:

filtering the first received RF signal prior to the combining step; and filtering the second received RF signal prior to the combining step.

23. A method as defined in claim 14, wherein the receiving a first RF signal step, the receiving a second RF signal step, and the combining step are performed in a housing.

24. A method as defined in claim 23, wherein the housing includes a magnet attached to the housing for selective removable attachment to a metal object.

25. A method as defined in claim 14, wherein each of the first and second antennas has a feeding point, and the two antennas are oriented relative to each other to maximize the distance between the feeding points of the two antennas.

26. A method as defined in claim 14, wherein each of the first and second antennas generally lie in a common plane and each has a feeding point, and wherein the two antennas are rotated relative to each other to maximize the distance between the feeding points of the two antennas.

27. An RF receiver system for use in an automotive vehicle, comprising:
- an antenna module that includes:
  - a GPS antenna element that receives electromagnetic signals at a GPS frequency range and produces a GPS received signal;
  - a first amplifier to amplify the GPS received signal;
  - a satellite radio antenna element that receives electromagnetic signals at a satellite radio frequency range and produces a satellite radio received signal;
  - a second amplifier to amplify the satellite radio received signal; and
  - a combiner that combines the amplified GPS and satellite radio received signals to produce a combined signal;
- a conductor connected to the combiner to carry the combined signal out of the antenna module;
- a first receiver subsystem that is receptive of the combined signal from the conductor, the first receiver subsystem including a filter to allow at least the components of the combined signal that are at the first particular frequency range to pass therethrough and a receiver to receive the components of the combined signal that are at the first particular frequency range; and
- a second receiver subsystem that is receptive of the combined signal from the conductor, the second receiver subsystem including a filter to allow at least the components of the combined signal that are at the second particular frequency range to pass therethrough and a receiver to receive the components of the combined signal that are at the second particular frequency range;
- wherein the first and second receiver subsystems are located remotely from the antenna module.

* * * * *

UNITED STATES PATENT AND TRADEMARK OFFICE
CERTIFICATE OF CORRECTION

PATENT NO. : 7,650,173 B2
APPLICATION NO. : 11/538952
DATED : January 19, 2010
INVENTOR(S) : Samavati et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 567 days.

Signed and Sealed this

Twenty-eighth Day of December, 2010

David J. Kappos
*Director of the United States Patent and Trademark Office*